(12) United States Patent
Cheng

(10) Patent No.: US 7,880,827 B2
(45) Date of Patent: Feb. 1, 2011

(54) DISPLAY DEVICE WITH SHIELDING ADHESIVE LAYER AND A METHOD FOR MANUFACTURING THEREOF

(75) Inventor: Shih-Ming Cheng, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 266 days.

(21) Appl. No.: 12/167,505

(22) Filed: Jul. 3, 2008

(65) Prior Publication Data
US 2009/0021679 A1   Jan. 22, 2009

(30) Foreign Application Priority Data
Jul. 16, 2007   (TW) ............................... 96125848 A

(51) Int. Cl.
*G02F 1/1333* (2006.01)
(52) U.S. Cl. ...................................................... 349/58
(58) Field of Classification Search ............... 349/58–61
See application file for complete search history.

(56) References Cited

U.S. PATENT DOCUMENTS 6,781,654 B2   8/2004   Kim et al.
7,495,738 B2 *   2/2009   Okuda .......................... 349/150
2003/0071941 A1   4/2003   Mizuno
2007/0222911 A1 *   9/2007   Murase .......................... 349/58
2007/0279548 A1 *   12/2007   Cho ............................. 349/61

FOREIGN PATENT DOCUMENTS

CN   1366203   8/2002
CN   1412781   4/2003

OTHER PUBLICATIONS

Chinese language office action dated May 16, 2008.

\* cited by examiner

*Primary Examiner*—Hemang Sanghavi
(74) *Attorney, Agent, or Firm*—Thomas, Kayden, Horstemeyer & Risley, LLP

(57) ABSTRACT

A display device and a manufacture method thereof are provided. The display device includes a base, a display panel, and a shielding adhesive layer. The display panel is disposed on the base. The display panel includes an active area and a border area enclosing the active area, wherein the border area has a corner portion. The shielding adhesive layer is disposed between the base and the display panel and distributed on the border area. The shielding adhesive layer does not extend to the corner portion and therefore directly exposes the corner portion to the base.

21 Claims, 13 Drawing Sheets

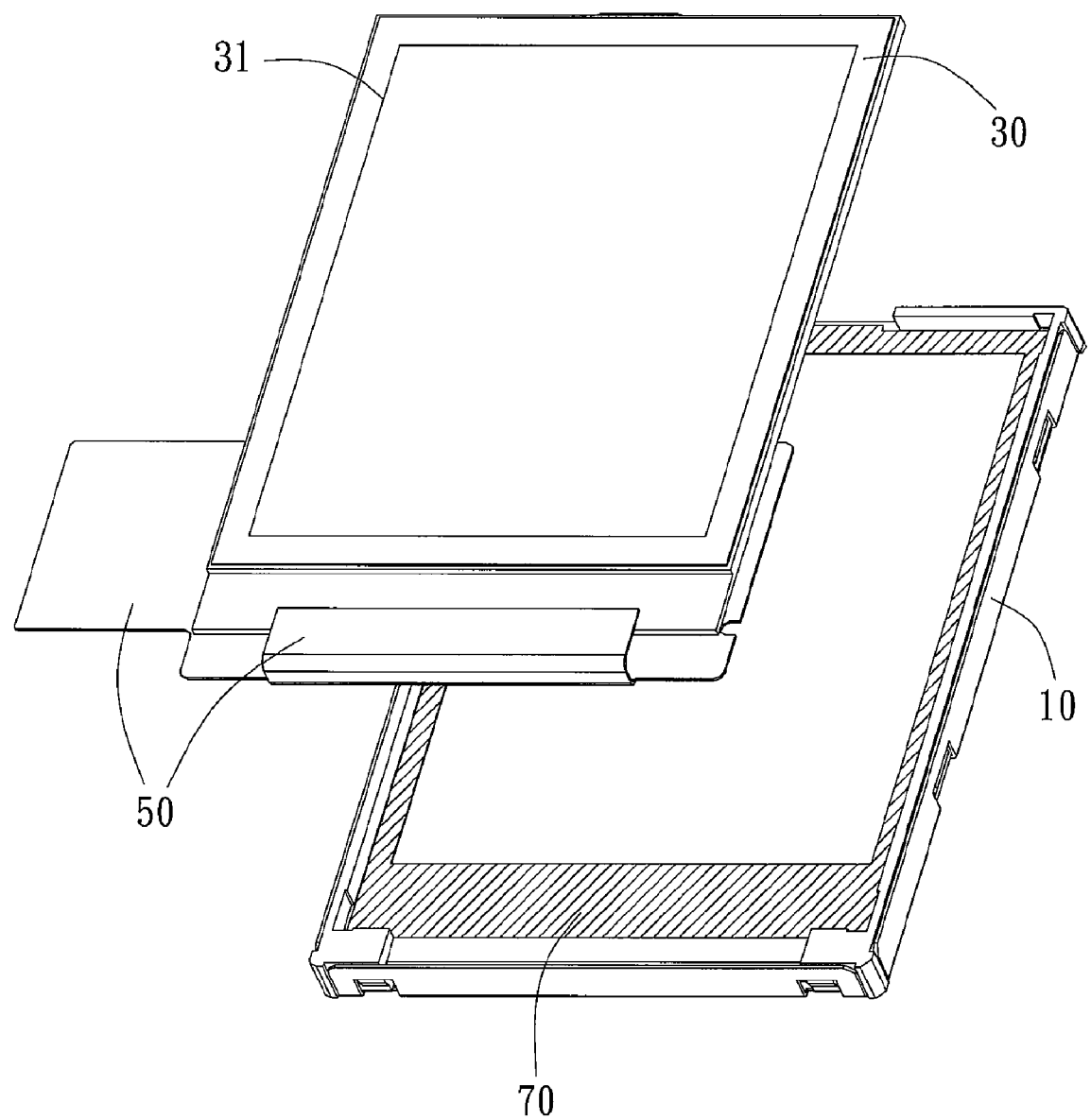
Fig. 1 (Piror Art)

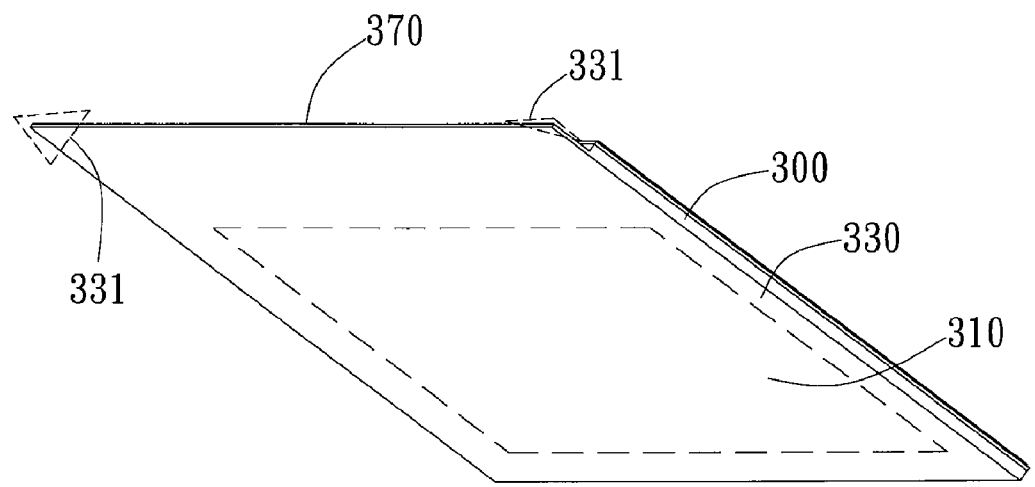
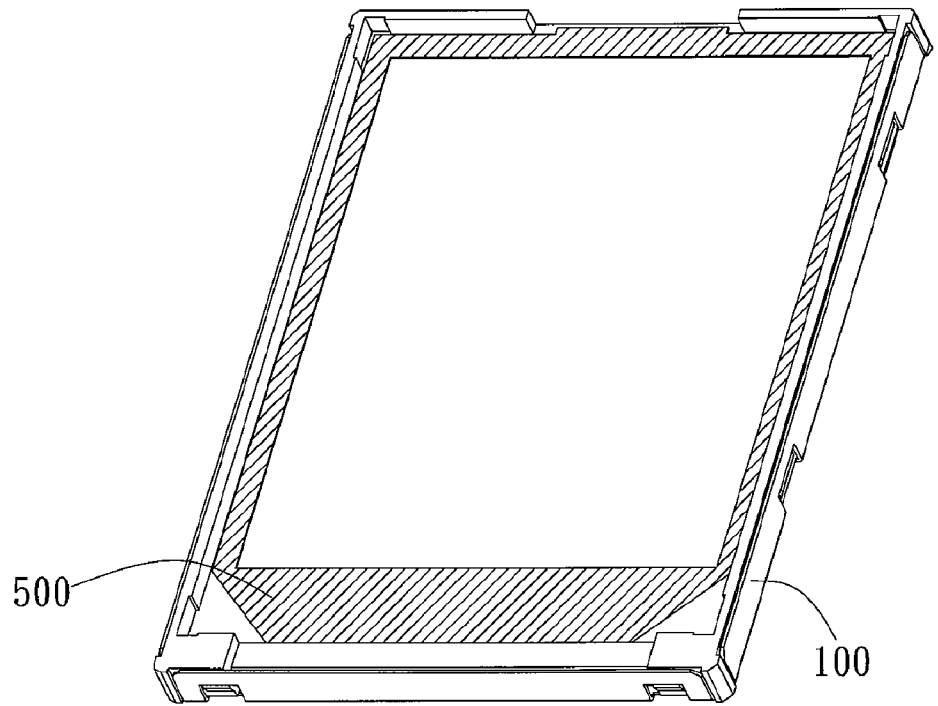
Fig. 2a

DISPLAY DEVICE WITH SHIELDING ADHESIVE LAYER AND A METHOD FOR MANUFACTURING THEREOF

This application claims benefit to a Taiwanese Patent Application No. 096125848, filed on Jul. 16, 2007.

BACKGROUND OF THE INVENTION

1. Field of the Invention

The present invention relates generally to a display device and a method for manufacturing thereof. Particularly, the present invention relates to a display device with a flat panel.

2. Description of the Prior Art

Display panels and flat display devices using display panels have become the mainstream of display device step by step. For example, people use a lot of display devices such as household thin televisions, LCD monitors used in personal computers and in laptops, the display screens of cellphones and digital camera.

Conventionally, display device includes a base and a display panel. In the embodiment of traditional LCD shown in FIG. 1, the display panel 30 is disposed on the base 10. The base 10 is a backlight module which provides light source emitting light into the display panel 30. One end of the display panel 30 has a flexible circuit board 50 to transmit signal from outside. In order to connect the display panel 30 and the base 10, an adhesive layer 70 is disposed between the display panel 30 and the base 10. The adhesive layer 70 is distributed along the edge of the base 10 to prevent blocking the light through the backlight module of the base 10. It is allowable to pass the light into the active area 31 of the display panel 30.

Generally, the active area 31 of the display panel 30 is double layer glasses but the end of the display panel 30 connecting to the flexible circuit board 50 is a single layer glass. Thus, when the display device is shook by external forces, the end of the display panel 30 connecting to the flexible circuit board 50 is more fragile than the active area 31. Because the adhesive layer can affix the bottom surface of the display panel 30 to the base 10. The display panel 30 is also deformed by external forces or stress due to the deformation of the stressed base 10. At the moment, the corner portion of the display panel 30 is vulnerable due to the stress concentration. Especially, the end of the display panel 30 connecting to the flexible circuit board 50 may crack easier.

Besides, in part of the manufacture steps, it is necessary to separate the display panel 30 and the base 10 for further processing. Such further processing can easily inflict crack or damage at the corner portion of the display panel 30.

SUMMARY OF THE INVENTION

It is an object of the present invention to provide a display device and a method for manufacturing thereof to reduce the chance of deformation of the display panel due to stress.

It is another object of the present invention to provide a display device and a manufacture method thereof for the convenience of further processing.

The display device of the present invention includes a base, a display panel and a shielding adhesive layer. The display panel is disposed on the base. The display panel includes an active area and a border area enclosing at least one part of the edge of the active area, wherein the border area has a corner portion. The shielding adhesive layer is disposed between the base and the display panel and is distributed on the border area. However, the distributing area of the shielding adhesive layer does not reach the corner portion of the border area and does not extend between the corner portion and the base. Thus, the shielding adhesive layer directly exposes the corner portion to the base. By adopting such design, it is useful to prevent the corner portion from crashing by stress to reduce the chance of damage. Furthermore, when it is required to separate the display panel and the base for further process, such design assists the separation between the display panel and the base from the corner portion to reduce the chance of deformation.

The display device manufacture method of the present invention includes following steps: positioning the shielding adhesive layer between the display panel and the base to directly expose the corner portion of the display panel to the base; affixing the shielding adhesive layer to the display panel and the base. Besides, the manufacture method also includes cutting the shielding adhesive layer to form the cut-corner to expose the corner portion.

BRIEF DESCRIPTION OF THE DRAWINGS

FIG. 1 shows a traditional LED display device.

FIG. 2a and FIG. 2b show an embodiment of the present invention of the display device.

FIGS. 3 and 2a show side views of the embodiment of the present invention.

DETAILED DESCRIPTION OF THE PREFERRED EMBODIMENT

The present invention provides a display device and a method for manufacturing the display device. In a preferable embodiment, the display device includes a flat display device using a display panel. The display panel preferably includes a LCD panel, a OLED panel or other display panels. Besides, the LCD panel includes transmissive LCD panel, reflective LCD panel, transflective LCD panel and other forms of LCD panel.

Figure 2B:
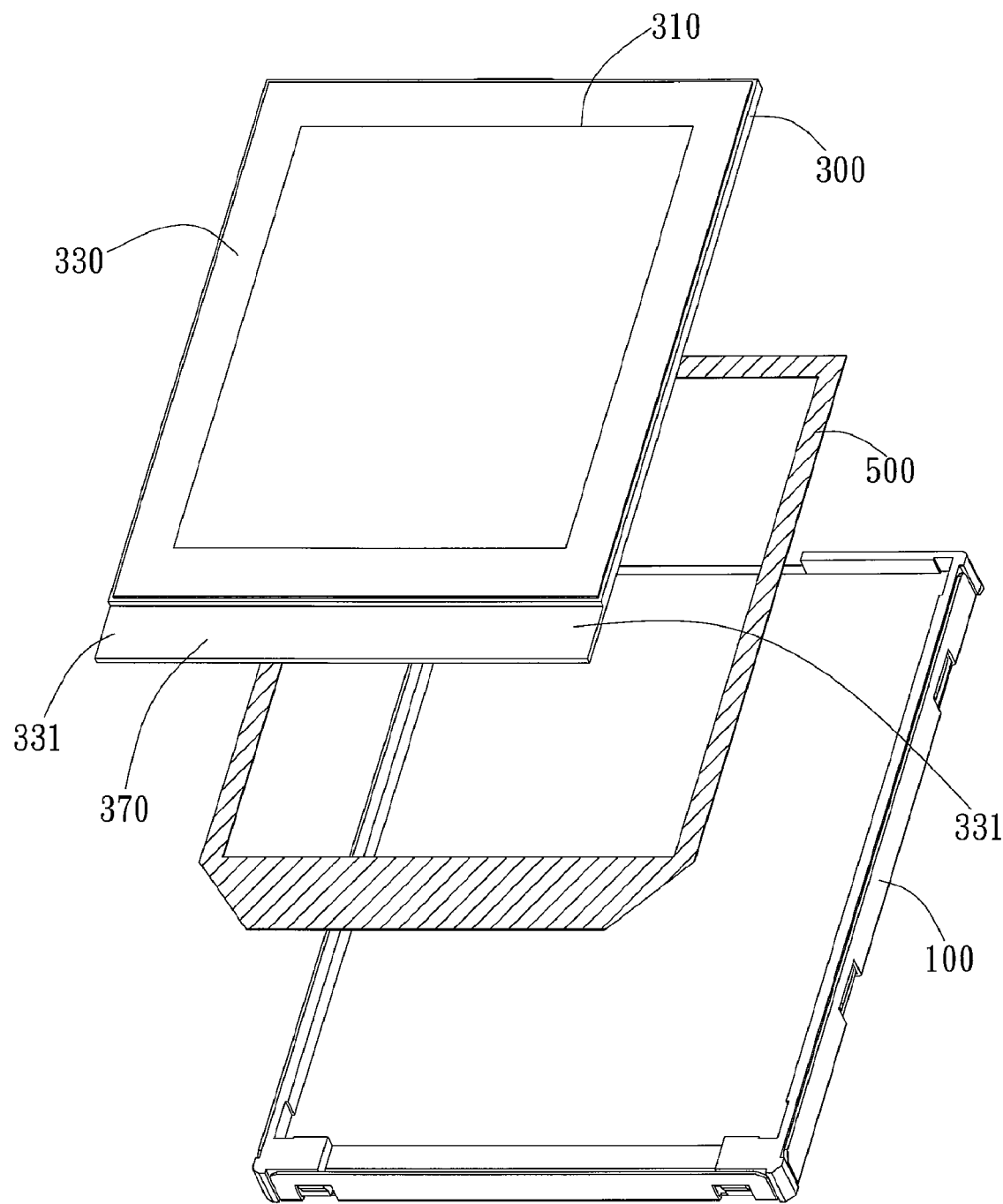

In the embodiment shown in FIG. 2a and FIG. 2b, the display device includes a base 100, a display panel 300 and a shielding adhesive layer 500. In the present embodiment, the base 100 includes a back plate of display device; however, in other embodiments, the base 100 may be formed by a backlight module. In the preferable embodiment, the base 100 preferably is made of metal material; however, in another embodiment, the base 100 may also be made of plastic or other material.

The display panel 300 is disposed on the base 100. With reference to FIG. 2a and FIG. 2b, the display panel 300 includes an active area 310 and a border area 330 enclosing the partial active area 310. In other words, the border area 330 is formed as a closed rectangle frame to enclose the active area 310. The border area 330 includes at least one corner portion 331. In this embodiment, the display panel has a signal terminal 370 connecting with outside signal sources. The corner portions 331 are formed at two ends of the signal terminal 370 and are disposed out of the active area 310. In preferable embodiment, the display panel 300 includes a LCD panel which further includes a transmissive, a reflective, a transflective or other forms of LCD panel. However, in other embodiments, the display panel 300 can also be an OLED panel or other flat display panel.

With reference to FIG. 2b, the shielding adhesive layer 500 is disposed between the base 100 and the display panel 300 and is distributed on the border area 330 of the display panel 300. However, the distributing area of the shielding adhesive layer 500 does not over and reach the corner portion 331 of the border area 300. It means that the shielding adhesive layer 500 does not extend into the area between the corner portion 331 and the base 100. Thus, the shielding adhesive layer 500 exposes the corner portion 331 to position the corner portion 331 corresponding to the base 100, shown in FIG. 3. The shielding adhesive layer 500 preferably includes a double-sided shielding tape with adhesiveness, wherein the tape can be designed to have black adhesive layer to absorb the light or be designed to have white adhesive layer to reflect the light. The material of the adhesive preferably is made of acrylic material, but may be made of other material for the same usage or purpose. Because the shielding adhesive layer 500 is not disposed between the corner portion 331 and the base 100, the displacement of the base 100 due to stress does not affect the corner portion 331 of the display panel 300. By such design, it is useful to prevent the corner portion 331 from damaging due to the stress concentration. Besides, when it is necessary to separate the display panel 300 from the base 100 to be further processed, this design can prevent the corner portion 331 from deformation due to the separation of the display panel 300 from the base 100.

Figure 3:
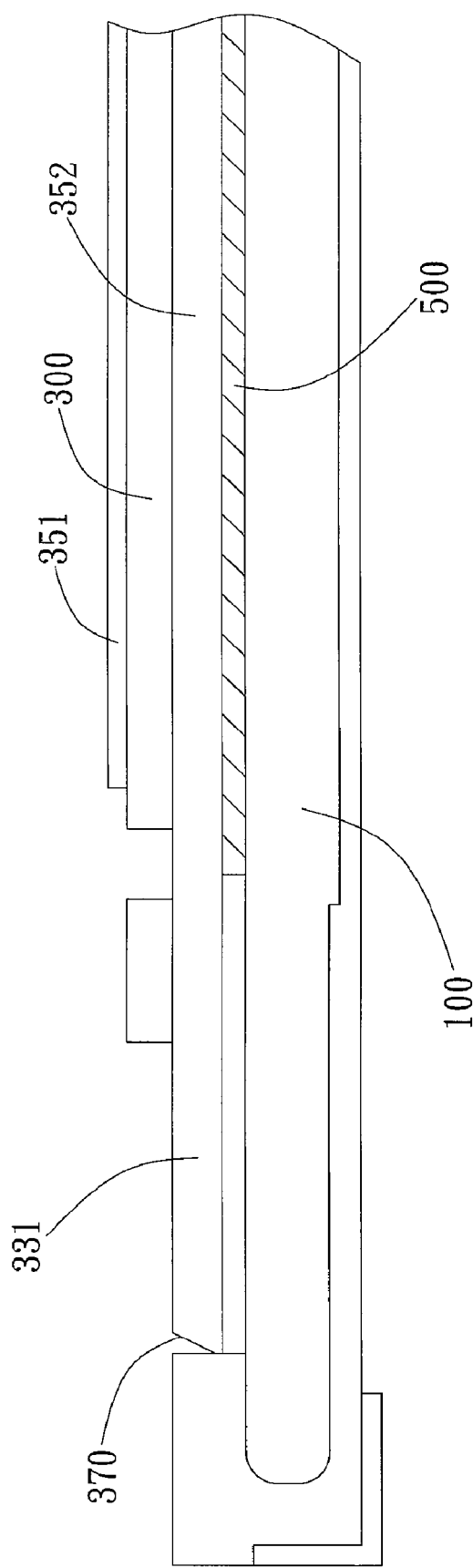

With reference to FIG. 3, the display panel 300 preferably includes an overlapped upper substrate 351 and a lower substrate 352. In the embodiment, the upper substrate 351 includes a display substrate. The lower substrate 352 includes an electronic circuit substrate where control elements are disposed. One end of the signal terminal 370 on the lower substrate 352 extends out of the upper substrate 351, wherein the preferable extending area has a driver circuit connecting with outside signal sources. At the moment, the corner portions 331 are formed at two ends of the protruding area of the lower substrate 352. In other words, the corner portion 331 is formed on the lower substrate 352 but is not on the upper substrate 351. However, in other embodiments, the corner portion 331 also includes the area covered by the upper substrate 351.

Figure 4:
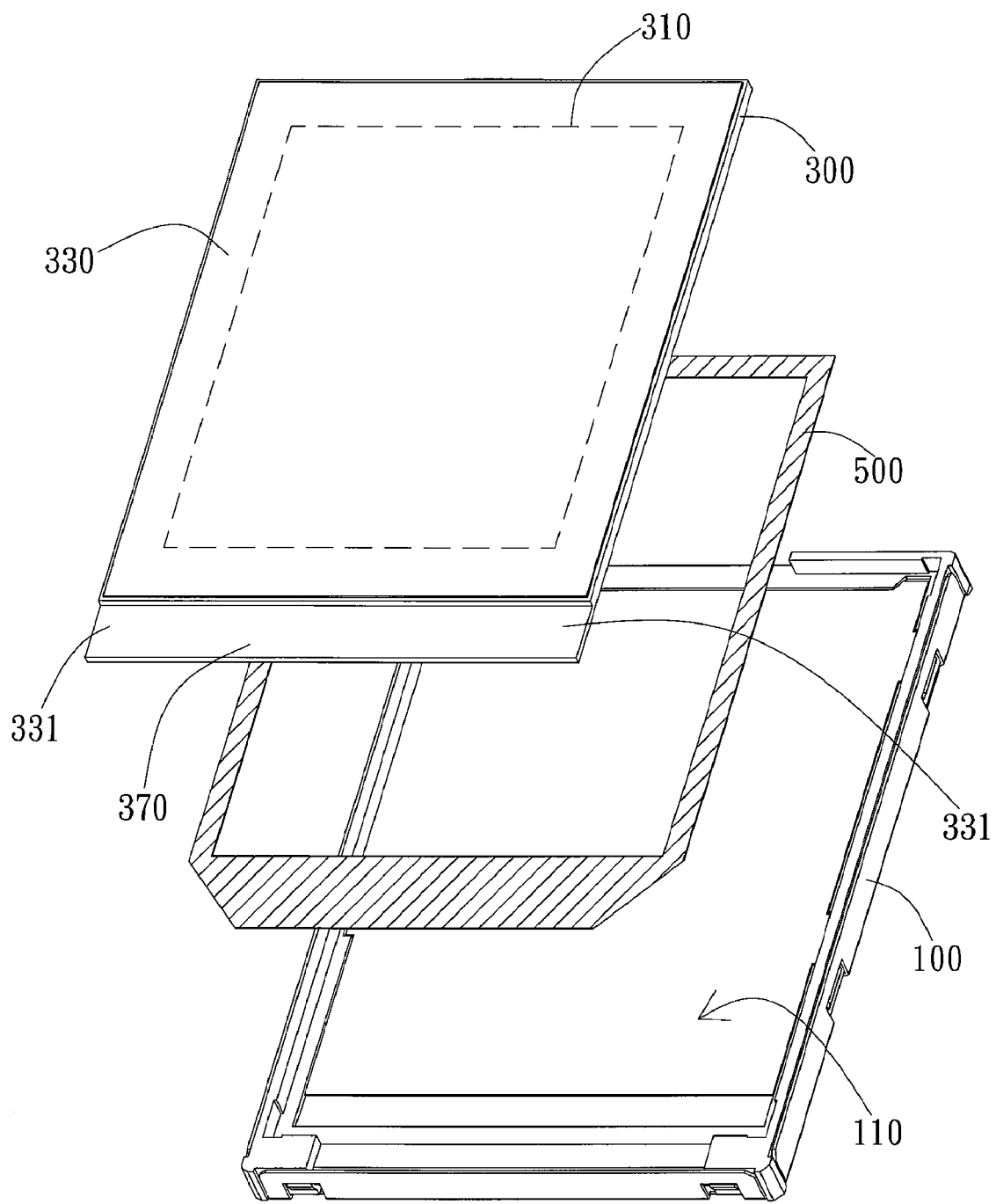
FIG. 4 illustrates the perspective view of the base including the backlight module.

In the embodiment shown in FIG. 4, the base 100 is a backlight module. The backlight module includes an illuminating area 110. The illuminating area 110 includes conductive plate or other optical films. The shielding adhesive layer 500 is disposed on the outside of the illuminating area 110 and encloses and exposes the illuminating area 110. The light generated by the illuminating area 110 irradiates into the active area 310 of the display panel 300 to form the images.

Figure 5A:
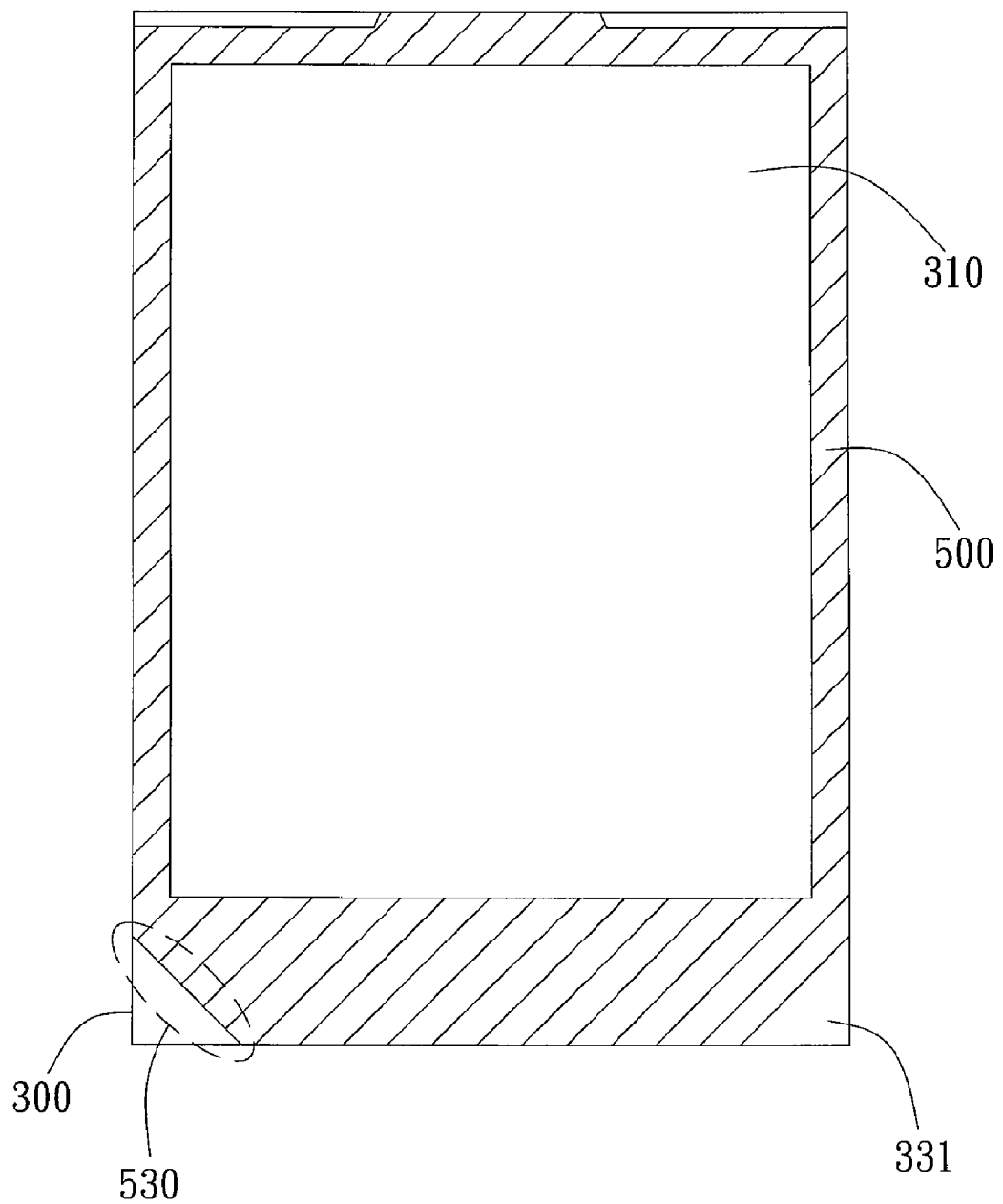
FIG. 5a to FIG. 5d show plan views of the cross-sections of the shielding adhesive layer.
Figure 5B:
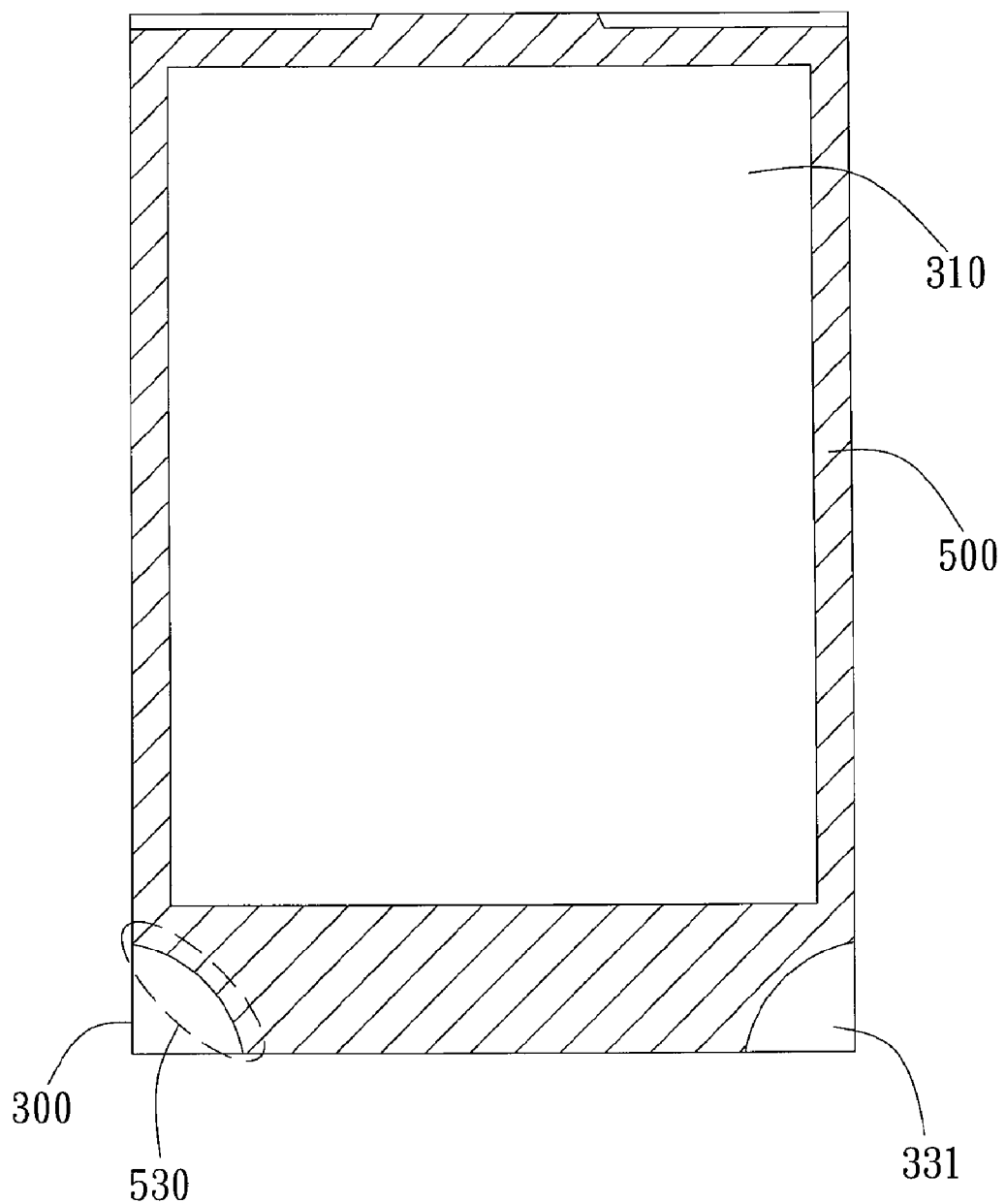
Figure 5C:
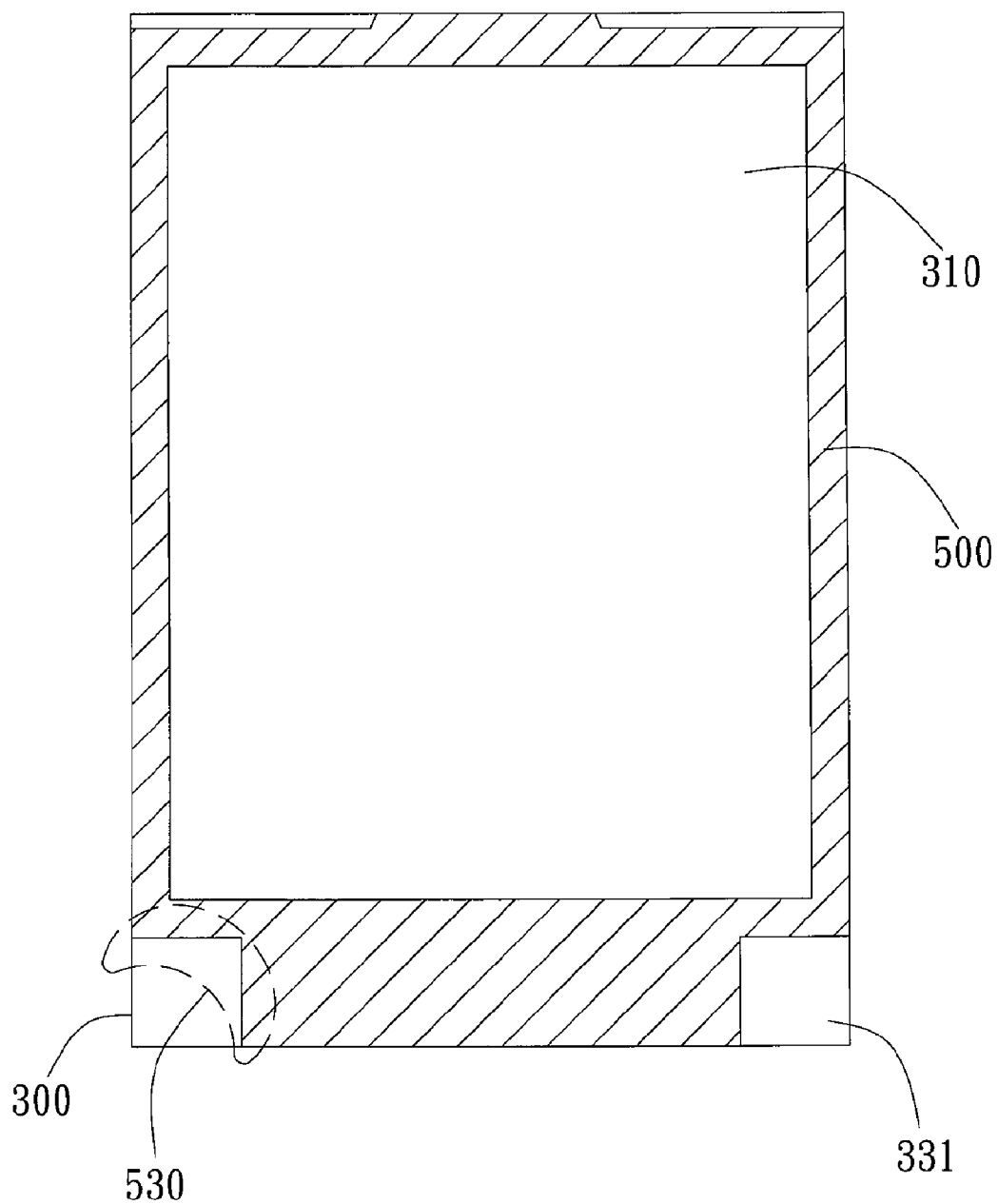
Figure 5D:
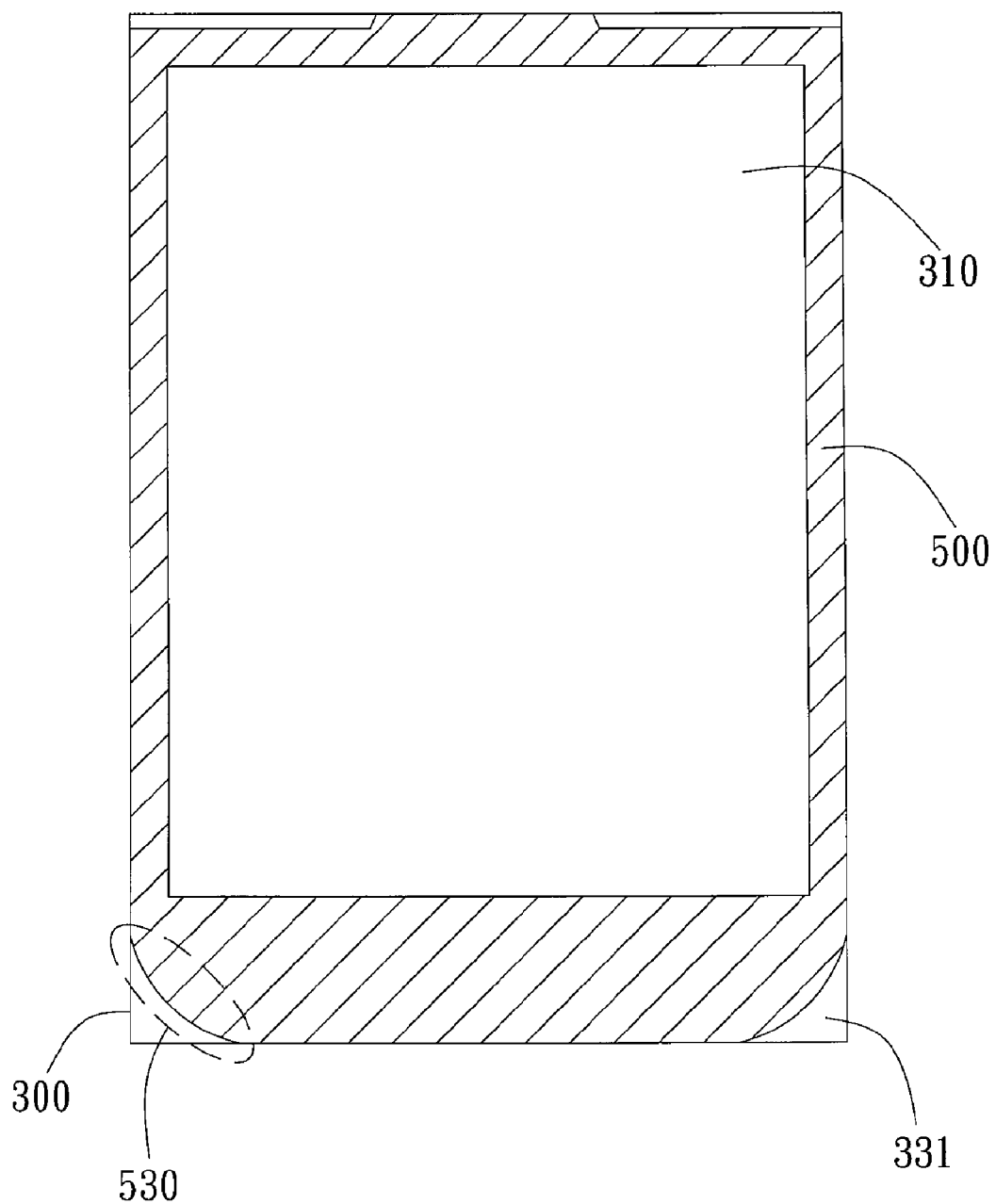

With reference to FIG. 5a, the position of shielding adhesive layer 500 corresponding to the corner portion 331 forms a cut-corner 530. Therefore, when the shielding adhesive layer 500 is affixed to the bottom of the display panel 300, the corner portion 331 is exposed by shielding adhesive layer 500. In the present embodiment, the cut-corner 530 is shaped in an oblique cross-section. Thus, the corner portion 331 is exposed as a triangle. In other embodiment shown in FIG. 5b, the cut-corner 530 is shaped in a concave cross-section to expose the cut-corner 530 as a fan-shape. In another embodiment shown in FIG. 5c, the cut-corner 530 is also shaped in a concave cross-section to expose the cut-corner 530 as a rect-angle. In yet another embodiment shown in FIG. 5d, the cross-section 530 is shaped in an arc.

Figure 6:
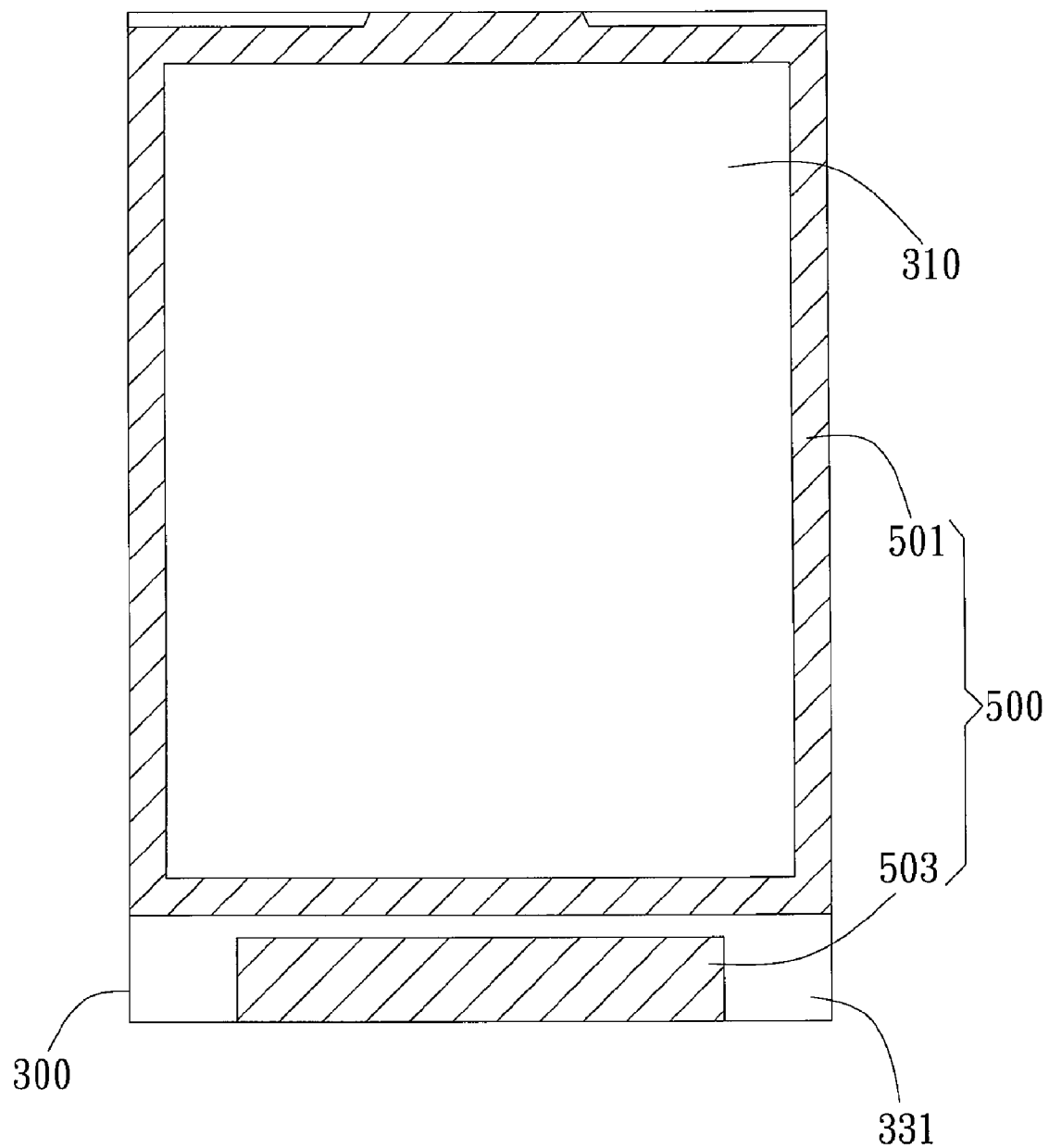
FIG. 6 shows another embodiment of the shielding adhesive layer.

In the embodiment shown in FIG. 6, the shielding adhesive layer 500 includes a closed frame 501 and a slice-shaped adhesive layer 503. The closed frame 501 encloses the active area 310 of the display panel 300. The slice-shaped adhesive layer 503 is disposed at the outside of one end of the closed frame 501. In the preferable embodiment, the slice-shaped adhesive layer 503 is disposed on the signal terminal 370 of the display panel 300. The width of the slice-shaped adhesive layer 503 is less than the width of the frame to expose the corner portions 331, which are disposed at two ends of the slice-shaped adhesive layer 503.

Figure 7:
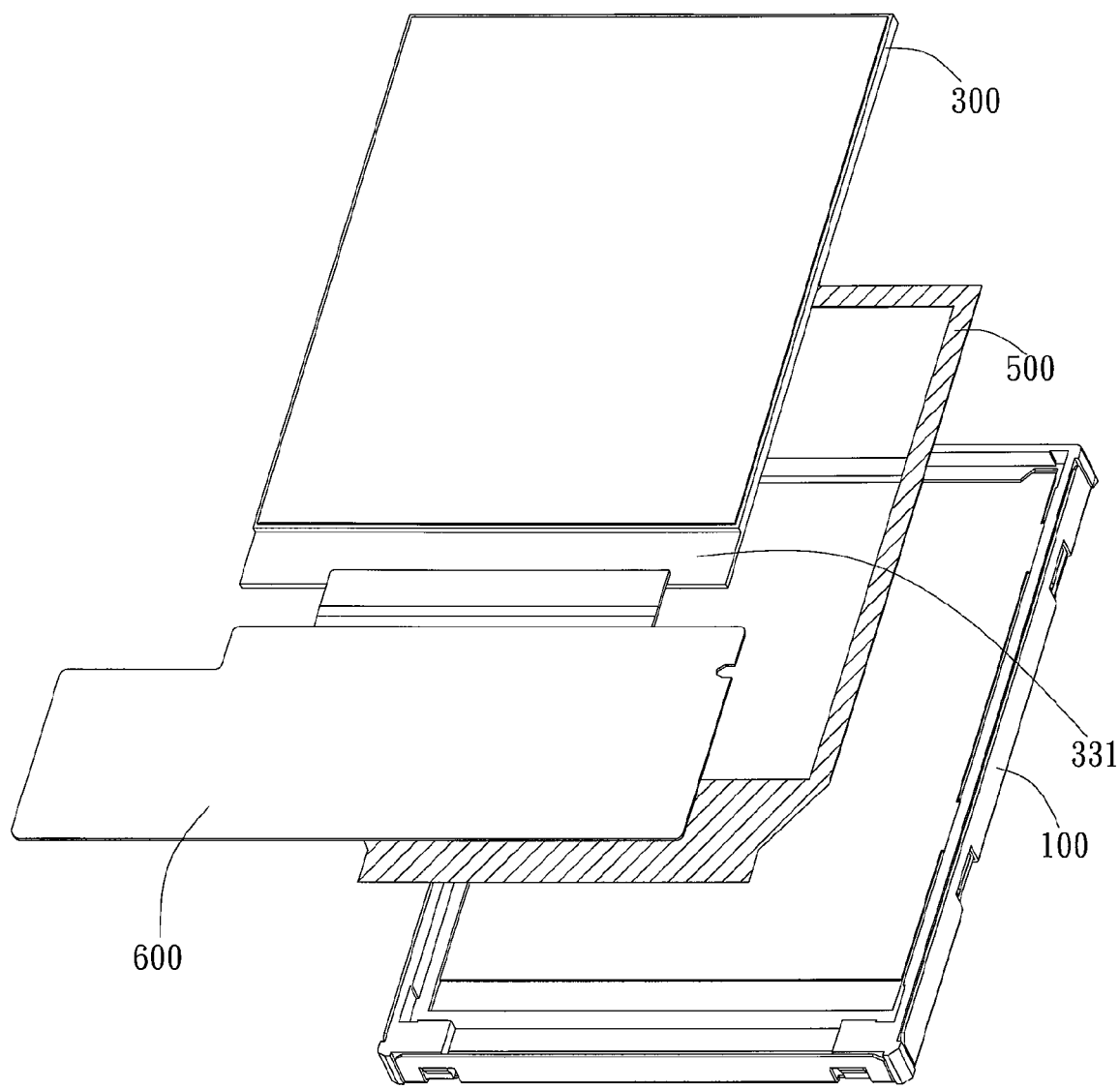
FIG. 7 shows a perspective view of the flexible circuit board.

In the embodiment shown in FIG. 7, the signal terminal 370 of the display panel 300 connects with a flexible circuit board 600 for transmitting external signals. The flexible circuit board 600 preferably folds to extend beneath the base 100. However, in another embodiment, the flexible circuit board 600 also directly extends toward outside. With reference to FIG. 7, the minimal width of the shielding adhesive layer 500 corresponding to the signal terminal 370 is equal or larger than the width of the connecting position of flexible circuit board 600 and the display panel 300. In another embodiment, the minimal width of the shielding adhesive layer 500 corresponding to the signal terminal 370 is the width of the cut-corner 530. By doing so, to the design provides enough adhesive force and prevents the flexible circuit board 600 from being detached from the display panel 300. Besides, with reference to FIG. 7, the shielding adhesive layer 500 further extends out of the range of the display panel 300 and reaches out between the flexible circuit board 600 and the base 100 to affix the flexible circuit board 600 to the base 100.

Figure 8:
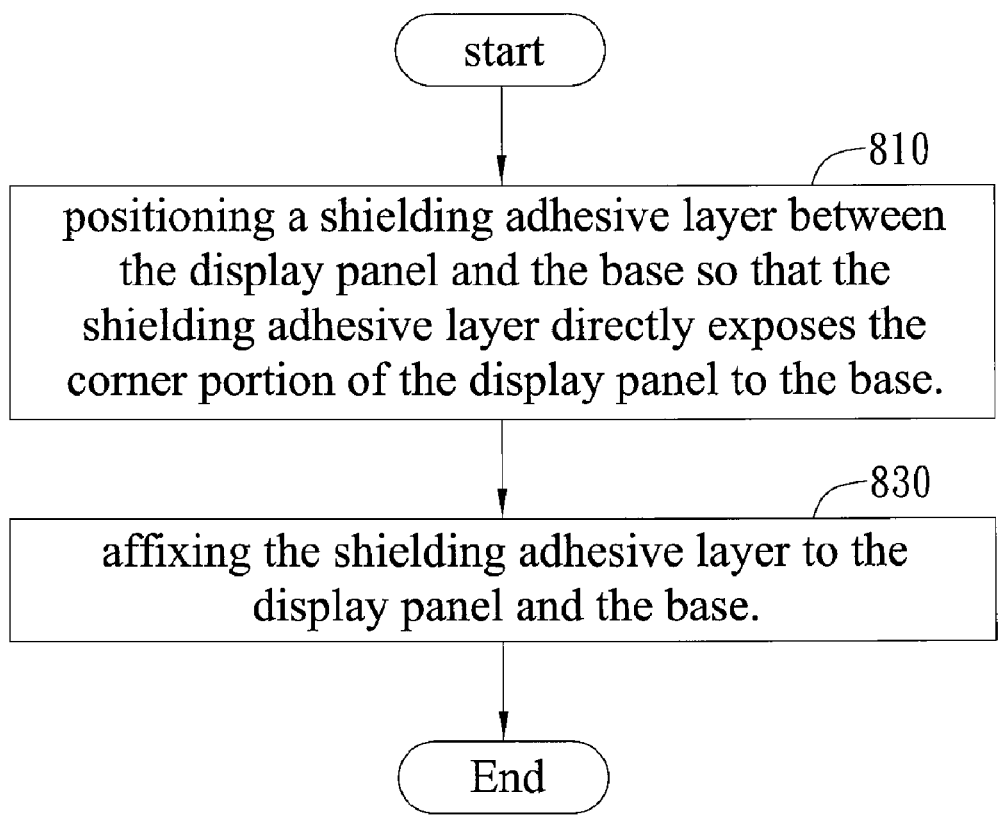
FIG. 8 shows a flow chart of an embodiment of the display device manufacturing method.

FIG. 8 shows the flow chart of the display device manufacturing method of the present invention. With reference to FIG. 8, the step 810 includes positioning a shielding adhesive layer between the display panel and the base so that the shielding adhesive layer directly exposes the corner portion of the display panel to the base. The shielding adhesive layer preferably includes an double sided adhesive shielding adhesive tape, wherein the tape can be designed to have black adhesive layer to absorb the light or be designed to white adhesive layer to reflect the light. The material of the adhesive preferably is made of acrylic material, but can also be made of other material for the same usage or purpose. Besides, the present step further includes positioning the shielding adhesive layer on the border area of the display panel and forming the active area enclosed by closed frame. However, in other embodiments, the shielding adhesive layer can be divided into several pieces of slice-shaped adhesive layers affixed to the border area without contacting the active area.

Step 830 includes affixing the shielding adhesive layer to the display panel and the base. In the present step, the shielding adhesive layer is stuck on the base at first, and then connects the display panel with the base. By doing so, two surfaces of the shielding adhesive layer stick the base and display panel, respectively. However, in another embodiment, the shielding adhesive layer can be stuck on the base of display panel and then connects with the base.

Figure 9:
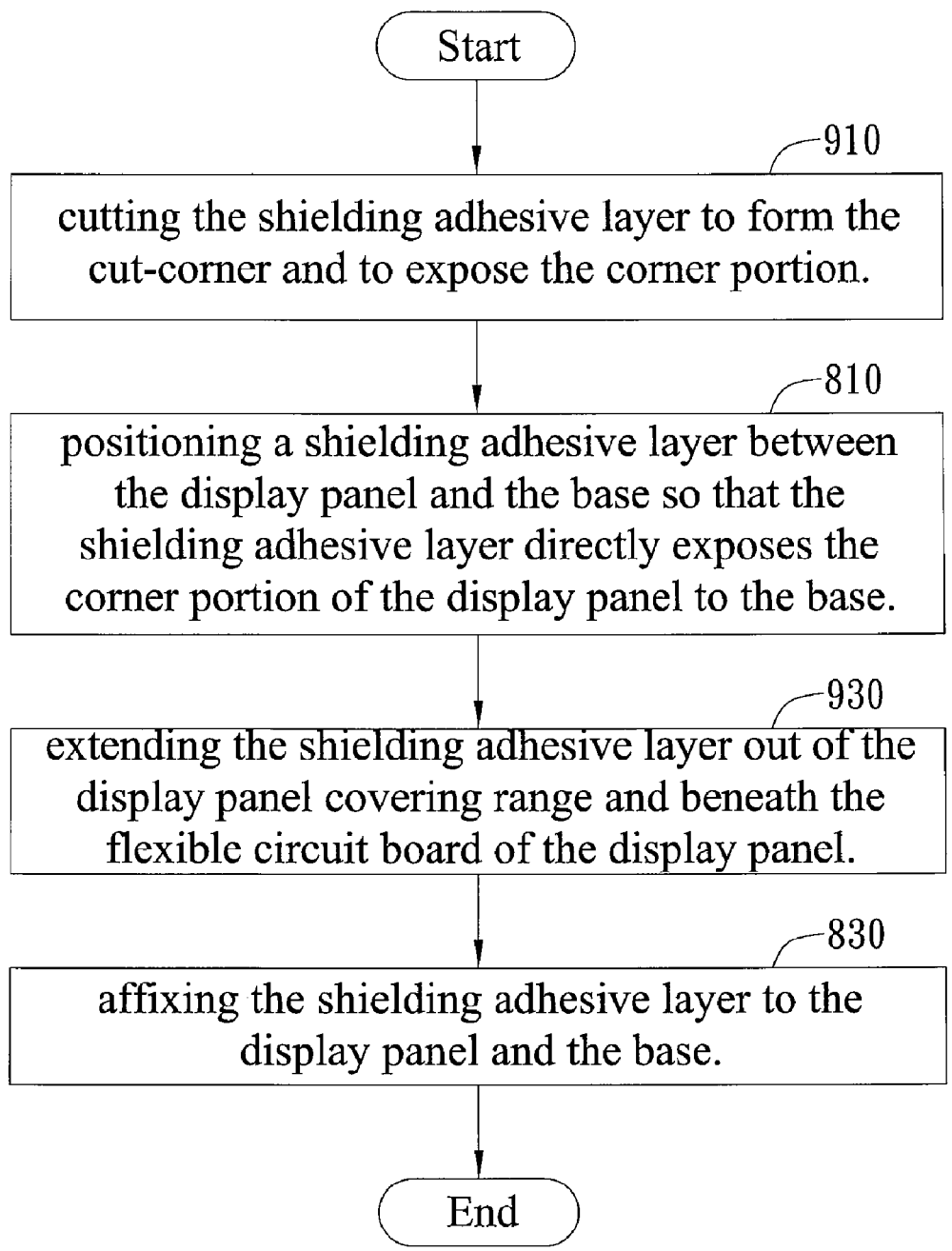
FIG. 9 shows another exampling flow chart of the manufacturing method of the present invention.

In the embodiment shown in FIG. 9, the manufacturing method further includes a step 910. The step 910 includes cutting the shielding adhesive layer to form the cut-corner and to expose the corner portion. The cut-corner includes an oblique cross-section, a concave cross-section, and an arc cross-section to expose the corner portions as a triangle, a rectangle, a fan-shape, an amorphous shape, or other shapes, respectively. Besides, in this step, it is preferable to position the cut-corner corresponding to the side of signal sources.

However, in the other embodiment, the cut-corner can be formed on other sides of the display panel.

Step 930 includes extending the shielding adhesive layer out of the display panel covering range and beneath the flexible circuit board of the display panel. Thus, during the assembly of the display panel and the base, the shielding adhesive layer can simultaneously stick the flexible circuit board and the base to position the flexible circuit board.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A display device comprising:
    a base;
    a display panel disposed on the base, wherein the display panel includes an active area and a border area enclosing the partial active area, the border area has a corner portion, the display panel includes an overlapped upper substrate and a lower substrate, one end of the lower substrate protrudes out of the upper substrate, the corner portion is a corner end of the protuberating part of the lower substrate; and
    a shielding adhesive layer, for adhering the base and the display panel, disposed between the base and the display panel and distributed on the border area to make the corner portion directly face to the base.

2. The display device of claim 1 further comprising a backlight module including an illuminating area enclosed and exposed by the shielding adhesive area.

3. The display device of claim 1, wherein the display panel has a signal terminal, the at least one corner portion is positioned in two ends of the signal terminal.

4. The display device of claim 3 further comprising a flexible circuit board connecting to the signal terminal of the display panel, wherein the width of the shielding adhesive layer corresponding to the signal terminal is not smaller than the width of the flexible circuit board.

5. The display device of claim 4, wherein the shielding adhesive layer is disposed between the base and the flexible circuit board, the shielding adhesive layer extends out of the display panel and beneath the flexible circuit board.

6. The display device of claim 1, wherein a position of the shielding adhesive layer corresponding to at least one corner portion forms a cut-corner to expose the corner portion.

7. The display device of claim 6, wherein the cut-corner is shaped in an oblique cross-section and exposes the corner portion as a triangle.

8. The display device of claim 6, wherein the cut-corner is shaped in a concave cross-section and exposes the corner portion as a rectangle.

9. The display device of claim 6, wherein the cut-corner is shaped in a concave cross-section and exposes the corner portion as a fan-shape.

10. The display device of claim 6, wherein the cut-corner is shaped in an arc.

11. The display device of claim 1, wherein the shielding adhesive layer forms a closed frame enclosing the active area.

12. The display device of claim 11, wherein the shielding adhesive layer further includes a slice adhesive layer disposed outside one end of the closed frame, the width of the slice adhesive layer is smaller than the width of the end of the closed frame.

13. A display device manufacture method comprising:
    positioning a shielding adhesive layer between a display panel and a base to expose at least one corner portion to the base, wherein the display panel includes an overlapped upper substrate and a lower substrate, one end of the lower substrate protrudes out of the upper substrate, the at least one corner portion is a corner end of the protuberating part of the lower substrate; and
    affixing the display panel to the base by the shielding adhesive layer to make the at least one corner portion directly face to the base.

14. The manufacture method of claim 13 further comprising cutting the shielding adhesive layer to form a cut-corner for exposing the corner portion.

15. The manufacture method of claim 14, wherein the shielding adhesive layer disposing step includes positioning the cut-corner corresponding to a signal terminal of the display panel to expose the corner portion in two ends of the signal terminal, respectively.

16. The manufacture method of claim 13 further comprising extending the shielding adhesive layer out of the display panel and out of the flexible circuit board connecting to the display panel.

17. The manufacture method of claim 14, wherein the cut-corner cutting step includes cutting the cut-corner as an oblique cross-section.

18. The manufacture method of claim 14, wherein the cut-corner cutting step includes cutting the cut-corner as a concave cross-section to expose the corner portion as a rectangle.

19. The manufacture method of claim 14, wherein the cut-corner cutting step includes cutting the cut-corner as a concave cross-section to expose the corner portion as a fan-shape.

20. The manufacture method of claim 14, wherein the cut-corner cutting step includes cutting the cut-corner as an arc.

21. The manufacture method of claim 13, wherein the shielding adhesive layer positioning step includes positioning the shielding adhesive layer on a border area of the display panel and forming a closed frame enclosing an active area surrounded by the border area.

* * * * *